United States Patent Office
3,456,036
Patented July 15, 1969

3,456,036
THERMOSETTING COPOLYMERS BASED ON ADDUCTS OF UNSATURATED AMIDES AND ORGANIC EPOXIDES

Henry Ashjian, East Brunswick, N.J., assignor to Mobil Oil Corporation, a corporation of New York
No Drawing. Filed Dec. 13, 1965, Ser. No. 513,582
Int. Cl. C08g 30/14, 33/02, 45/12
U.S. Cl. 260—837                          9 Claims

ABSTRACT OF THE DISCLOSURE

Thermosetting acrylic resins are provided by adducting an unsaturated amide, such as acrylamide, with an organic epoxide which may be either a monoepoxide or a polyepoxide. The reaction is carried out at temperatures below 150° F. in the liquid phase. The adduct is unsaturated and is copolymerized with other monoethylenically unsaturated materials to form a copolymer which is soluble in organic solvents and which when baked at elevated temperatures cures. The thermosetting cure may be enhanced by the presence of epoxy-functional monomers or unreacted amide monomers in the copolymer and curing temperature is lowered by the presence of aminoplast resin.

---

The present invention relates to new thermosetting acrylic resins and their preparation involving the combination of ethylenically unsaturated amides and organic epoxide compounds to provide functional monomers capable of polymerizing with other ethylenically unsaturated monomers.

At the present time, thermosetting acrylic resins are combined with epoxide compounds, and especially liquid or solid epoxy resins, such as glycidyl ethers of bisphenol compounds, in order to improve chemical resistance, fabrication resistance and adhesion. Unfortunately, unless the acrylic resin is carefully selected, there is a tendency toward incompatibility which impairs desired properties. Even when the incompatibility is slight, the defect may reveal itself upon aging or overbaking.

Efforts have also been made to combine epoxy compounds including epoxy resins with vinyl monomers, such as acrylic acid, in order that they might be copolymerized. Unfortunately, when temperatures sufficiently elevated to effect the combination are used, the vinyl monomer tends to polymerize. Thus, and when efforts were made in this direction, difficulties were encountered, as illustrated in U.S. Patent 2,890,202, in which acrylic acid is combined into the product through the use of acrylyl chloride at what are referred to as moderate temperatures, but which are still in excess of those which are required in order to obtain the benefits of the present invention.

The invention embraces acrylic resins in which the epoxide compound is included within the resin as an integral part thereof. Further, and while the acrylic resins of the invention are thermosetting per se to some extent, a feature of the invention is the inclusion in the system of an aminoplast resin to provide a relatively stable admixture adapted for a more uniform cure over a wide range of temperature including the achievement of a good thermosetting cure at lower temperatures, e.g., effective curing at 275° F.

In the present invention, an ethylenically unsaturated amide is reacted with an organic epoxide in the liquid phase and at a temperature below 150° F. (in order to avoid premature polymerization) to obtain a vinyl-functional amide intermediate which possesses hydroxy functionality, and which, in addition, may also possess epoxy functionality. This vinyl-functional amide intermediate is capable of copolymerization with other ethylenic material, especially vinyl monomers, to form valuable copolymers. When the vinyl amide intermediate is essentially monoethylenically unsaturated, large proportions of vinyl monomer may be used in a solution copolymerization to form organic solvent-soluble, non-gelled products. When the vinyl amide intermediate is polyethylenically unsaturated, it may be combined with a small proportion of vinyl monomer in a 100% solids system and thermoset directly. The polyethylenically unsaturated intermediate can also be used in solution copolymerization if care is taken so that premature gelation is avoided. In this manner soluble resins are obtained which thermoset on baking by a cure which includes reaction of the hydroxyl group in the polymer. The production of valuable copolymers by polymerization in bulk or in emulsion is also contemplated.

It is to be observed that the invention enables thermosetting acrylic resins to be tailor-made to include, in a wide diversity of acrylic backbones, any desired proportion or type of organic epoxide.

From the standpoint of materials, any vinyl amide may be used, and many are known. Nonetheless, the invention prefers to employ monoethylenically unsaturated carboxylic acid amides, especially acrylamides, such as acrylamide itself or methacrylamide. Other useful amides are illustrated by amides of other acids, such as monobutyl maleate, crotonic acid, maleic acid, fumaric acid and itaconic acid. Still further amides are illustrated by alkoxy vinyl amides and vinyl succinimide.

Any organic epoxide may be used, though the invention prefers to employ polyglycidyl ethers of polyhydric inorganic compounds, especially polyhydric phenols. Particularly preferred are the glycidyl ethers of bisphenols, a class of compounds which are constituted by a pair of phenolic groups interlinked through an intervening aliphatic bridge. While any of the bisphenols may be used, the compound 2,2'-bis(p-hydroxy-phenyl propane), commonly known as bisphenol A, is more widely available in commerce and is preferred. These polyglycidyl ethers are produced by reacting the polyhydric compound with epichlorohydrin followed by dehydrohalogenation to form the glycidyl ether, the proportion of excess epichlorohydrin being regulated to control molecular weight which may vary to produce either liquid or solid polyepoxides. On the other hand, other resinous polyepoxides may be used, such as oxidized oily polybutadiene and epoxidized unsaturated oils. While polyglycidyl ethers, and especially diglycidyl ethers are particularly preferred, monoepoxides may also be used, including ethylene oxide, propylene oxide, any of the various butylene oxides and styrene oxide.

The preferred class of organic epoxides can be defined as glycidyl ethers of hydroxy-substituted organic compounds from the group consisting of hydrocarbons and halogen-substituted hydrocarbons. Ethylene oxide and propylene oxide are also of especial interest in providing ethylolated and propylolated amide-containing interpolymers. Epichlorohydrin is of curious interest in providing oxirane-functional amide interpolymers.

On an equivalent basis, one may use as many as one equivalent of acrylamide per equivalent of oxirane group in the organic epoxide compound. On the other hand, and when a polyepoxide is used, one may use less than an equivalent ratio as specified hereinbefore down to as little as one mol of unsaturated amide, such as acrylamide, per mol of polyepoxide. When less than one equivalent of unsaturated amide per equivalent of epoxide is used, then some of the epoxide will remain unreacted which, while not desirable, can be tolerated.

The reaction of the epoxide with the amide is a liquid phase low temperature addition reaction which has been found to take place at temperatures sufficiently low as to substantially prevent homopolymer formation during the combination. Thus, the invention is limited to reaction temperatures of 150° F. and below and is sharply distinguished from the use of other vinyl compounds which are significantly less useful because more elevated reaction temperatures are needed.

It is desired to point out that when the amide and epoxide compounds are used in stoichiometric amounts, that the addition reaction generates hydroxyl groups which provide hydroxyl functionality for a subsequent thermosetting cure. On the other hand, if less than a stoichiometric amount of amide is employed with a polyepoxide, then some of the epoxide functionality is retained to also participate in the ure. It is to be particularly noted that the invention permits the production of polyallylic derivatives of polyepoxide which can be used to form three-dimensional polymers as a result of the plurality of unsaturated centers of polymerization in the resinous polyepoxide.

The ethylenic materials which are copolymerizable with the unsaturated amide-epoxide reaction product may be of diverse type, but preferably they are monomers containing a single $CH_2=C<$ group. While the preferred unsaturated monomers do contain the $CH_2=C<$ group and while it is preferred to use combinations of monomers which form hard polymers such as styrene, vinyl toluene and methyl methacrylate with monomers which form soft polymers such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, stearyl acrylate, butyl methacrylate, 2-ethylhexyl methacrylate and stearyl methacrylate, the invention is not restricted to the selection of monomers containing the $CH_2=C<$ group or to the selection of preferred combinations of monomers. Thus, monomers which do not contain the $CH_2=C<$ group may be interpolymerized either alone or in the presence of monomers which do contain the $CH_2=C<$ group. Particular attention is directed to maleic acid or anhydride, maleic acid monoesters and diesters, butene-2 and fatty acids containing conjugated unsaturation such as dehydrate castor oil fatty acids which are useful in the production of interpolymers with acrylamide. Still other monomers which may be used are acrylic acid, methacrylic acid, 1,3-butadiene, vinyl ethers such as n-butyl vinyl ether, allyl alcohol, bicyclo (2-2-1) hept-5-ene-2-methane, glycidyl methacrylate, acrylamide, methacrylamide, etc. Allyl chlorides and especially vinylidene chloride can be used to provide resins of improved fire retardency. The copolymers which include epoxy or amide functionality as is provided by from 2–20%, preferably from 3–15% by weight of glycidyl methacrylate, acrylamide or methacrylamide unconsumed by the amide-epoxide reaction provide improved thermosetting characteristics in the absence of an extraneous aminoplast curing component.

While the invention produces copolymers containing hydroxyl functionality, the monomer or the polymer derived therefrom may be produced in alcoholic medium and etherified thereby. If desired, acid catalysts and the removal of water may be used to encourage etherification.

Broadly, the unsaturated amide-epoxide reaction product may constitute from 1 to 95% by weight of the copolymer. Below 5%, these reaction products are useful to improve adhesion and water resistance in aqueous emulsion interpolymers. In solution polymers, at least 5% of the reaction product is normally used, desirably from 10%–30%. Large proportions are also useful in soluble, non-gelled interpolymers, but proportions in excess of 50% are preferably used only when at least a portion of the reaction product is polyethylenically unsaturated and the polymer is employed in admixture with some liquid vinyl monomer, such as styrene, to provide 100% solids systems which thermoset when cast in the presence of heat and a peroxide polymerization catalyst or the like.

The invention is illustrated in the examples which follow:

EXAMPLE I

A polyglycidyl ether of bisphenol A having an average molecular weight of about 1000 and an epoxy value of 0.20 equivalent per 100 grams is combined with acrylamide in a 1:1 mol ratio by reacting the same in a 50% solid solution containing equal parts by weight of butanol and diacetone alcohol as solvents. The reaction was conducted by heating the liquid solution at 140° F. until the Gardner-Holdt room temperature viscosity is from X–Z.

EXAMPLE II

Example I is repeated replacing the polyepoxide used therein with an equimolar proportion of a liquid diglycidyl ether of bisphenol A having an average molecular weight of about 390 and an epoxy value of 0.54 equivalent per 100 grams. The solvent solution of the epoxy and amide components is cooked at 140° F. until the room temperature viscosity is from $Z$–$Z_3$.

EXAMPLE III

Example I is repeated, but the mixture of epoxy and amide components, which is 1:1 in Example I is changed to 1:2 in the present example, to provide two mols of acrylamide for each mol of the polyepoxide. The solution mixture is cooked to a Gardner-Holdt room temperature viscosity of $Y$–$Z_2$.

EXAMPLE IV

Example II is repeated using the 1:2 mol ratio of polyepoxide to acrylamide used in Example III.

EXAMPLE V

The solution product of Example I is combined with a 50% solvent solution containing equal parts by weight of methyl methacrylate and butyl acrylate including 2½% by weight of total monomers of acrylic acid dissolved in a commercial mixture of aromatic hydrocarbon solvents having a boiling range of from 145–195° C. By combining 50 parts of the product of Example I with 50 parts of the methyl methacrylate-butyl acrylate-acrylic acid solution and refluxing at atmospheric pressure for eight hours in the persence of 1.0% by weight of benzoyl peroxide based on total polymerizable material, copolymer is formed in good yield to provide a solution having a Gardner-Holdt viscosity of X–Y. The copolymer is thermosettable per se and cures more rapidly and at lower baking temperature by mixing the same with heat-hardening aminoplast resins, such as urea-formaldehyde or melanine-formaldehyde condensates or with conventional alkyd resins used in the coating industry, especially hydroxyl-functional alkyd resins, or with additional epoxy resin, such as those referred to hereinbefore. Appropriate baking temperatures are from 250° F.–500° F. for periods of time varying from one-half hour at the lowest temperature to one-half minute at the highest temperature.

EXAMPLE VI

Example V is repeated using the solution product of Example III in place of the solution of product of Example I on an equivalent basis. The copolymer product, unlike the product of Example V, does not include significant epoxy functionality, but otherwise the two products are comparable.

EXAMPLE VII

The copolymer of Example V, which contains 0.45 epoxy equivalent per 1000 grams, is combined with a polyamide resin obtained from triethylene tetramine and polymeric fats as taught in U.S. Patent 2,705,223, in a weight ratio of 70 parts of copolymer to 30 parts of polyamide. Films of the product cure to an impervious tile-like finish at room temperature.

EXAMPLE VIII

Example VII is repeated replacing the polyamide resin used therein with the same stoichiometric proportion based on amino hydrogen of (1) diethylene trimine and (2) triethylene tetramine. Corresponding results are obtained in each instance upon room temperature cure.

Examples VII and VIII illustrate the capacity of the invention to provide epoxy-functional copolymers which may be cured using conventional polyamines and polyamides and the like in order to provide thick and hard weather resistant films which provide superior resistance to chemical attack as a result of the incorporation of a vinyl polymer chain in the polyepoxide component of the mixture.

EXAMPLE IX

The solution product of Example I is combined with a 50% solution of vinylidene chloride/ethyl acrylate/acrylic acid in a weight ratio of 85/10/5 in a 50/50 weight ratio mixture of butanol and methyl ethyl ketone. By combining 50 parts of the solution product of Example I with 50 parts of the vinylidene chloride/ethyl acrylate/acrylic acid solution and refluxing at atmospheric pressure for eight hours in the presence of 1% by weight of azodiisobutyronitrile, a copolymer is formed in good yield to provide a solution having a solids content of about 50%, and a Gardner-Holdt viscosity of A–B. The copolymer so produced, when cured with polyamide or polyamine, as described in Examples VII and VIII, provides films of improved solvent resistance in comparison with conventional epoxypolyamide resins, while imparting fire retardant properties to the film.

EXAMPLE X

React 1 mol of acrylamide with 1 mol of propylene oxide by cooking at 100° F. for three hours to provide a monomeric reaction product which possesses hydroxy functionality and which retains its ethylenic unsaturation.

EXAMPLE XI

Example V is repeated using a 50% solvent solution of the product of Example X dissolved in equal parts by weights of butanol and diacetone alcohol in place of the solution product of Example I. Approximately comparable results are obtained.

EXAMPLE XII

React in the liquid phase one mol of acrylamide with one mol of epichlorohydrin by cooking the mixture of the two at 100° F. for three hours to provide a liquid reaction product which possesses ethylenic unsaturation. At the end of the reaction, vacuum is applied to strip off hydrogen chloride gas to provide an epoxy-functional monomer capable of being copolymerized in the same way as glycidyl methacrylate.

EXAMPLE XIII

Example XI is repeated using the product of Example XII in place of the product of Example X to produce an epoxy-functional copolymer instead of an hydroxy-functional copolymer.

The invention is defined in the claims which follow.

I claim:
1. A method of producing a thermosetting acrylic copolymer comprising:
    (1) reacting an ethylenically unsaturated amide with an organic epoxide compound in the liquid phase and at a temperature below 150° F. to produce an hydroxy-functional ethylenically unsaturated adduct, said reaction being carried out utilizing proportions in the range of equimolar amounts up to 1 equivalent of amide per equivalent of oxirane group in said epoxide component; and subsequently
    (2) copolymerizing said adduct with ethylenically unsaturated material copolymerizable therewith.
2. A method as recited in claim 1 in which said ethylenically unsaturated amide is a monoethylenically unsaturated carboxylic acid amide and the reaction is carried out utilizing proportions in the range of equimolar amounts up to 1 equivalent of amide per equivalent of oxirane group in said epoxide compound.
3. A method as recited in claim 2 in which said amide is an acrylamide.
4. A method as recited in claiam 2 in which said epoxide compound is a glycidyl ether of an hydroxy-substituted organic compound selected from the group consisting of hydrocarbons and halogen-substituted hydrocarbons.
5. A method as recited in claim 2 in which said hydroxy-functional adduct constitutes at least 5% by weight of the copolymer.
6. A method as recited in claim 2 in which said epoxide compound is a polyglycidyl ether of a polyhydric phenol.
7. A method as recited in claim 2 in which said ethylenically unsaturated material copolymerizable with said unsaturated adduct is constituted by monoethylenically unsaturated monomer.
8. A method as recited in claim 7 in which said ethylenically unsaturated material copolymerizable with said unsaturated adduct comprises unsaturated carboxylic acid.
9. A method as recited in claim 2 in which said unsaturated amide is reacted with an equimolar proportion of a polyepoxide to produce a monoethylenically unsaturated vinyl amide intermediate.

References Cited

UNITED STATES PATENTS 3,378,601  4/1968  Tanaka _____ 260—836

FOREIGN PATENTS 226,747  11/1958  Australia.

SAMUEL H. BLECH, Primary Examiner

PAUL LIEBERMAN, Assistant Examiner

U.S. Cl. X.R.

260—23, 32.8, 33.4, 33.6, 78, 78.5, 80.3, 86.1, 87.5, 87.7, 88.1, 834, 835, 836